(12) United States Patent
Wu (10) Patent No.: US 9,791,707 B2
(45) Date of Patent: Oct. 17, 2017

(54) AUTO-STEREOSCOPIC DISPLAY APPARATUS AND NON-TRANSITORY COMPUTER READABLE STORAGE DEVICE

(71) Applicant: AU OPTRONICS CORP., Hsin-Chu (TW)

(72) Inventor: Hsin-Ying Wu, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 451 days.

(21) Appl. No.: 14/464,109

(22) Filed: Aug. 20, 2014

(65) Prior Publication Data

US 2015/0054928 A1    Feb. 26, 2015

(30) Foreign Application Priority Data

Aug. 23, 2013 (TW) .............................. 102130332 A (51) Int. Cl.
*G02B 27/22* (2006.01)
*H04N 13/04* (2006.01)

(52) U.S. Cl.
CPC ..... *G02B 27/2214* (2013.01); *H04N 13/0404* (2013.01)

(58) Field of Classification Search
CPC .................................................. G02B 27/2214
USPC .......................................................... 348/59
See application file for complete search history.

(56) References Cited

U.S. PATENT DOCUMENTS

| 6,069,650 A * | 5/2000 | Battersby ........... G02B 27/2214 345/6 |
| 8,154,587 B2 | 4/2012 | Fukushima et al. |
| 2004/0257531 A1 * | 12/2004 | Hattori ............... H04N 13/0409 353/10 |

(Continued)

FOREIGN PATENT DOCUMENTS

| CN | 1573421 | 2/2005 |
| CN | 1815293 | 8/2006 |

(Continued)

OTHER PUBLICATIONS

Taiwan Patent Office, "Office Action", Nov. 14, 2014.

(Continued)

*Primary Examiner* — William C Vaughn, Jr.
*Assistant Examiner* — Joseph A Towe
(74) *Attorney, Agent, or Firm* — WPAT, PC (57) ABSTRACT

An auto-stereoscopic display apparatus and a storage media are provided. The auto-stereoscopic display apparatus includes a display area, which includes a display panel and a lens layer. The display panel includes a plurality of pixel rows sequentially arranged in a first direction. Each one of the pixel rows includes a plurality of pixels sequentially arranged in a second direction substantially perpendicular to the first direction. Each one of the pixels includes a plurality of sub-pixels sequentially arranged in the second direction. The lens layer is disposed on the display panel and includes a plurality of lenticular lenses substantially arranged in the second direction. N successive sub-pixels in each pixel row are corporately covered by one of the lenticular lenses. A ratio of a component of a width in the second direction of each lenticular lens to a width of each sub-pixel in the second direction is configured to a non-integer.

6 Claims, 12 Drawing Sheets

(56) References Cited

U.S. PATENT DOCUMENTS

| | | | | |
|---|---|---|---|---|
| 2006/0170834 A1* | 8/2006 | Kim | ............ | G02B 27/2264 349/15 |
| 2008/0239482 A1* | 10/2008 | Fukushima | ........ | G02B 27/2214 359/463 |
| 2012/0019518 A1* | 1/2012 | Kim | ............ | H04N 13/0415 345/419 |
| 2012/0200916 A1* | 8/2012 | Bent-Gourley | .... | G02B 27/2214 359/463 |
| 2013/0044372 A1* | 2/2013 | Lo | ............ | G02B 5/201 359/463 |
| 2013/0050817 A1* | 2/2013 | Sumi | ............ | G02B 27/2214 359/463 |
| 2013/0250408 A1 | 9/2013 | Wu et al. | | |
| 2014/0029095 A1* | 1/2014 | Allio | ............ | H04N 13/0404 359/464 |
| 2015/0029317 A1* | 1/2015 | Kim | ............ | G02B 27/2214 348/59 |

FOREIGN PATENT DOCUMENTS

| | | |
|---|---|---|
| CN | 102707448 | 10/2012 |
| CN | 103096109 | 5/2013 |
| TW | 200506431 | 2/2005 |

OTHER PUBLICATIONS

China Patent & Trademark Office, "Office Action" May 21, 2015.
SIPO State Intellectual Property Office of the People's Republic of China, Office Action issued Dec. 14 2015.

\* cited by examiner

AUTO-STEREOSCOPIC DISPLAY APPARATUS AND NON-TRANSITORY COMPUTER READABLE STORAGE DEVICE

TECHNICAL FIELD

The present disclosure relates to an auto-stereoscopic display apparatus, and more particularly to a lens structure adopted in the auto-stereoscopic display apparatus. The present disclosure further relates to a storage media for storing application software for designing the aforementioned lens.

BACKGROUND

With the progress and development in technology, people continue and never stop for pursuing a better material life as well as a higher spiritual level. To realize people's limitless imagination, some of today's display apparatuses are being developed to be capable of displaying three-dimensional images.

According to the appearance, the three-dimensional display technologies may be divided into stereoscopic and auto-stereoscopic; and the stereoscopic may be further divided into color filter glasses, polarizing glasses and shutter glasses. For a stereoscopic display apparatus, a user can observe three-dimensional images by receiving left-eye images and right-eye images, which are contained with specific information and transmitted from a display apparatus to his or her left eye and right eye, through headset glasses, respectively. However, because it is quite inconvenient for users to wear glasses every time when they try to watch three-dimensional images, the stereoscopic display apparatus gradually fails to gain popularity in the general entertainment. Therefore, the auto-stereoscopic display apparatuses gradually develop and become the main trend in market.

The conventional auto-stereoscopic is further divided into spatial-multiplexed and time-multiplexed. For a spatial-multiplexed display apparatus, the pixels on its display panel are divided into odd-pixel and even-pixel image pairs; wherein the odd-pixel image pairs are used for displaying the images for the left eye (or the right eye) and the even-pixel image pairs are used for displaying the images for the right eye (or the left eye). In addition, lenticular lenses or parallax barriers for light splitting are employed in the spatial-multiplexed display apparatus so that the odd-pixel and the even-pixel image pairs are able to be projected to the left eye (or the right eye) and the right eye (or the left eye), respectively. For a time-multiplexed display apparatus, a backlight source is employed for the aforementioned light splitting mechanism; and a three-dimensional image is formed when the right-eye image and the left-eye images are alternatively transmitted to the right eye and left eye according to the employed backlight source's directional feature.

It is to be noted that no any real three-dimensional image is actually generated by the aforementioned display apparatuses. In fact, the three-dimensional image effect is created by first dividing a normal image into left-eye and right-eye images and then delivering the two into user's eyes, respectively, so as to cheat user's brain. However, the aforementioned conventional stereoscopic display apparatuses may cause users dizzy, vomitous or other uncomfortable feelings. In addition, some users may have problems to observe three-dimensional images through the aforementioned mechanisms.

There is another type of auto-stereoscopic display technology called real auto-stereoscopic display technology. The real auto-stereoscopic display technology can be divided into volumetric, holography and integral photography auto-stereoscopic display technologies. The holography auto-stereoscopic display technology is limited by the crystal size of its acousto-optic modulator, read and write speed and full-color display complexity; thus, in one aspect the holography auto-stereoscopic display technology may not be able to meet the real-time performance requirement. The volumetric auto-stereoscopic display technology may have a lower resolution due to the limit of its reflector size. In addition, because of the holography as well as volumetric auto-stereoscopic display technologies lack of the reduced-size design feature, both may not have wide applications. Compared with the holography and volumetric auto-stereoscopic display technologies, the integral photography auto-stereoscopic display technology may become the main trend in the next-generation auto-stereoscopic display technologies due to its completive compatible stereoscopic display effect and reasonable complexity.

SUMMARY

An embodiment of the disclosure provides an auto-stereoscopic display apparatus. The auto-stereoscopic display apparatus includes a display area. The display area includes a display panel and a lens layer. The display panel is configured to receive an image sequence and accordingly display a corresponding image. The display panel includes a plurality of pixel rows sequentially arranged in a first direction. Each one of the pixel rows includes a plurality of pixels sequentially arranged in a second direction substantially perpendicular to the first direction. Each one of the pixels includes a plurality of sub-pixels sequentially arranged in the second direction. The lens layer is disposed on the display panel and includes a plurality of lenticular lenses substantially arranged in the second direction. N successive sub-pixels in each pixel row are corporately covered by one of the lenticular lenses. A ratio of a component of a width in the second direction of each lenticular lens to a width of each sub-pixel in the second direction is configured to a non-integer.

Another embodiment of the disclosure provides a storage media for storing an application software adapted to be used for designing the aforementioned auto-stereoscopic display apparatus. An execution of the application software comprising steps of: obtaining a total equivalent air gap thickness of the optical layer by summing up all the thicknesses of each layer in the optical layer divided by a respective and defining the aforementioned total equivalent air gap thickness of the optical layer as $d_{air}$; obtaining a width of each one of the sub-pixels in the second direction and defining the aforementioned width as $w_p$; obtaining a minimum outgoing angle difference of each adjacent two lenticular lenses and defining the aforementioned minimum outgoing angle difference as $\Delta\theta$; obtaining a panel width of the display panel in the second direction and defining the aforementioned panel width as L; obtaining a nearest viewing distance of the auto-stereoscopic display apparatus and defining the aforementioned nearest viewing distance as NVD; and calculating a value $d_{max}$ according to the N, $\phi$, $w_p$, $\Delta\theta$, NVD and L, wherein $d_{max}-\Delta d \leq d_{air} \leq d_{max}+\Delta d$ and $\Delta d/d_{max} < 0.1$.

Still another embodiment of the disclosure provides a storage media for storing an application software adapted to be used for designing the aforementioned auto-stereoscopic display apparatus. An execution of the application software comprising steps of: obtaining a nearest viewing distance of the auto-stereoscopic display apparatus and defining the aforementioned nearest viewing distance as NVD; obtaining a panel width of a main-lobe observed at the nearest viewing distance and defining the aforementioned panel width as $L_M$; obtaining a width of each one of the sub-pixels in the second direction and defining the aforementioned width as $w_p$; obtaining a minimum outgoing angle difference of each adjacent two lenticular lenses and defining the aforementioned minimum outgoing angle difference as $\Delta\theta$; obtaining an angular spread of each one of the sub-pixels and defining the aforementioned angular spread as $\gamma$; obtaining a maximum acceptable angular spread corresponding to the width of the lenticular lens in a space and defining the aforementioned maximum acceptable angular spread as $MA_{lense}$; and calculating a value $N_{min}$ and a value $N_{max}$ according to the $\gamma$, $\phi$, $w_p$, $\Delta\theta$, $MA_{lense}$, NVD and L, wherein $N_{min} \leq N \leq N_{max}$.

BRIEF DESCRIPTION OF THE DRAWINGS

The present disclosure will become more readily apparent to those ordinarily skilled in the art after reviewing the following detailed description and accompanying drawings, in which.

DETAILED DESCRIPTION OF PREFERRED EMBODIMENTS

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
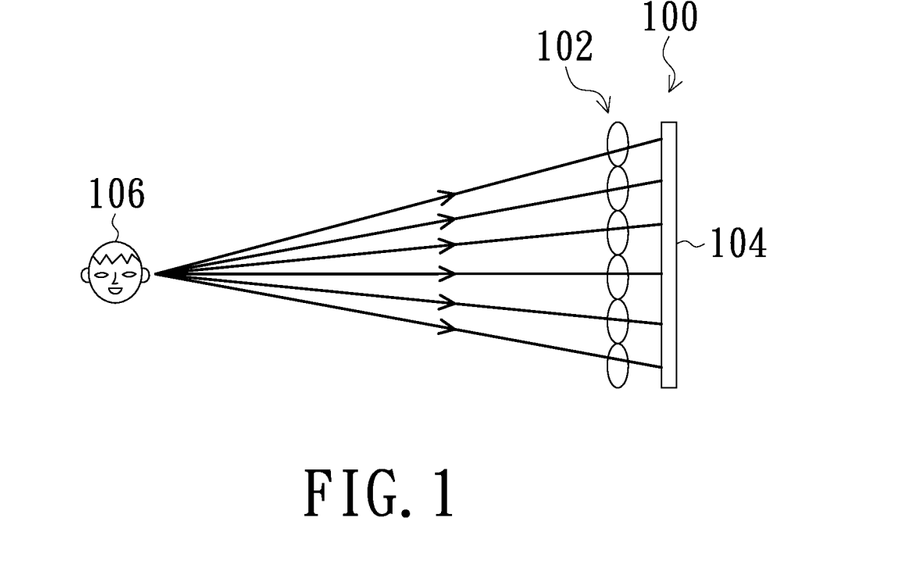
FIG. 1 is a schematic view of an integral photography apparatus in accordance with an embodiment of the present disclosure.
Figure 2:
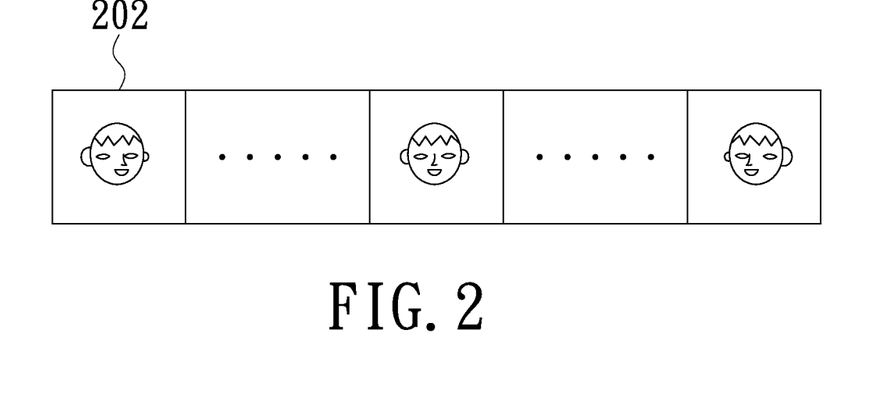
FIG. 2 is a schematic view illustrating an image sequence.

FIG. 1 is a schematic view of an integral photography apparatus in accordance with an embodiment of the present disclosure. As shown, the integral photography apparatus 100 in this embodiment includes a lens array 102 and a photosensitive element 104; wherein it is to be noted that the lens array 102 may be optional in another embodiment. The photosensitive element 104 herein is referred to as a conventional film, a metal oxide semiconductor (CMOS) element or a charge coupled device (CCD). Specifically, the integral photography apparatus 100 is configured to capture a plurality of images of an object 106 passing through the lens array 102 at different angles and accordingly obtain an image sequence 202 as illustrated in FIG. 2.

Figure 3:
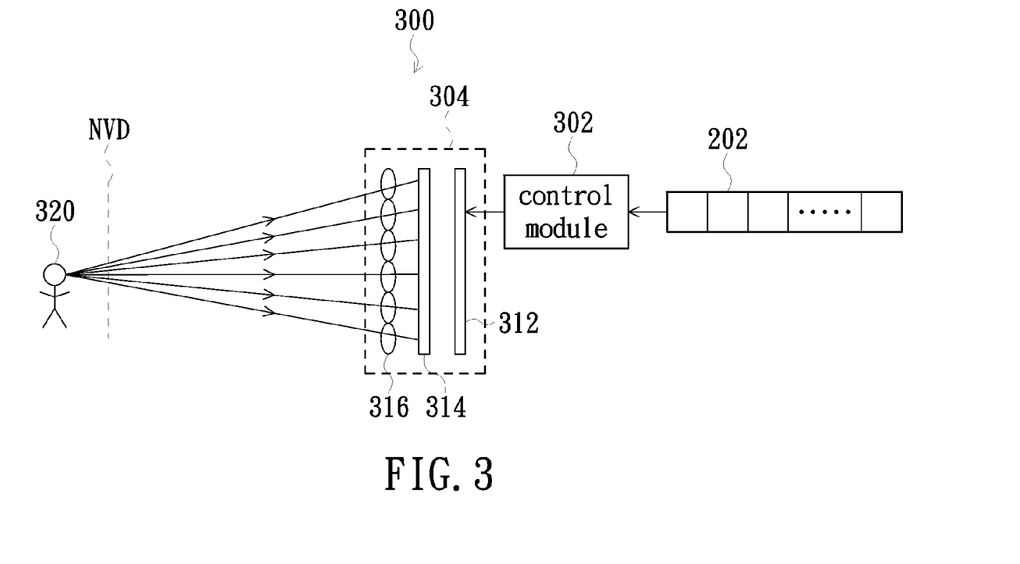
FIG. 3 is a schematic view illustrating an auto-stereoscopic display apparatus displaying a three-dimensional image in accordance with an embodiment of the present disclosure.

FIG. 3 is a schematic view illustrating an auto-stereoscopic display apparatus displaying a three-dimensional image in accordance with an embodiment of the present disclosure. As shown, the auto-stereoscopic display apparatus 300 (for example, an integral imaging stereoscopic display apparatus) in this embodiment includes a control module 302 and a display module 304. Specifically, the control module 302 is configured to reconstruct an original optical field distribution of the object 106 (FIG. 1) by processing the received image sequence 202 based on a specific integral imaging algorithm (for example, the integral imaging algorithm disclosed in U.S. Pat. No. 7,736,005) when the image sequence 202 of FIG. 2 is received by the auto-stereoscopic display apparatus 300. Then, the display module 304 is configured to display a corresponding three-dimensional image when the data processed by the aforementioned integral imaging algorithm is transmitted thereto from the control module 302.

As shown in FIG. 3, the display module 304 includes a display panel 312, an optical layer 314 and a lens layer 316; wherein the optical layer 314 is disposed between the display panel 312 and the lens layer 316. Specifically, the display panel 312 is configured to display a corresponding image when the processed data is transmitted to the display module 304 from the control module 302. Then, sequentially through the optical layer 314 and the lens layer 316, the image displayed on the display panel 312 is outputted to the eyes of user 320. Accordingly, a virtual three-dimensional object 106 can be observed by the user 320 through the auto-stereoscopic display apparatus 300.

Figure 4:
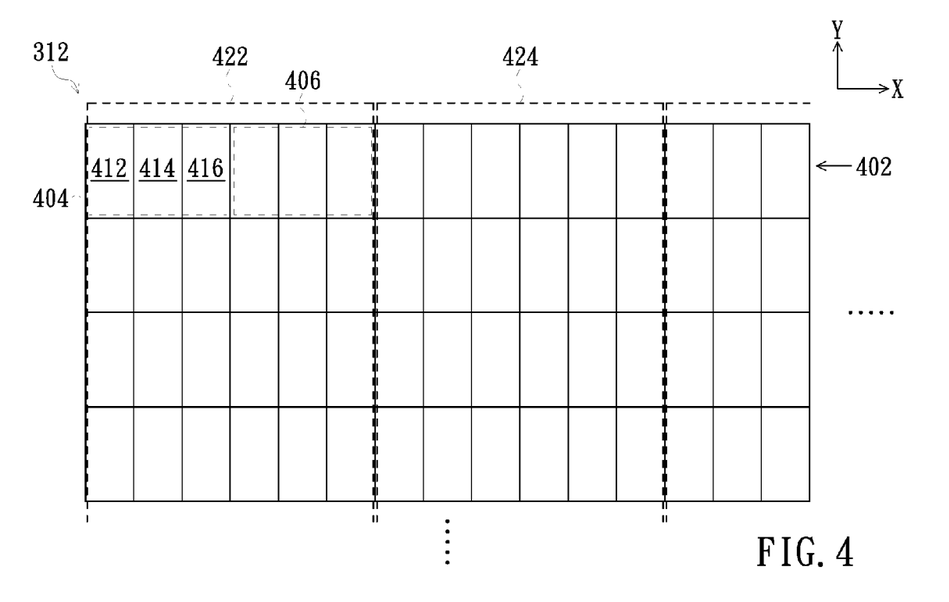
FIG. 4 is a schematic view of the display panel shown in FIG. 3 in accordance with an embodiment of the present disclosure.

FIG. 4 is a schematic view of the display panel 312 shown in FIG. 3 in accordance with an embodiment of the present disclosure. Please refer to FIGS. 3 and 4 together. As shown, the display panel 312 includes a plurality of pixel rows (for example, the pixel row 402) sequentially arranged in a direction Y. Each pixel row includes a plurality of pixels (for example, the pixels 404 and 406) sequentially arranged in a direction X. Each pixel includes a plurality of sub-pixels (for example, the sub-pixels 412, 414 and 416) sequentially arranged in the direction X. Thus, a pixel array is formed on the display panel 312.

In addition, the lens layer 316 includes a plurality of lenticular lenses (for example, the lenticular lenses 422 and 424); wherein the lenticular lenses are substantially arranged in the direction X and each approximately extends towards the direction Y. In one embodiment, approximately N sub-pixels in each pixel row are corporately covered by one respective lenticular lens of the lens layer 316; wherein the value N is determined based on some parameters of the auto-stereoscopic display apparatus 300, such as the nearest viewing distance (NVD), panel width and observable angular range. In one exemplary embodiment as illustrated in FIG. 4, each lenticular lens is configured to cover six successive sub-pixels in each pixel row; however, it is to be understood that the present disclosure is not limited thereto. In particular, it is to be noted that the ratio of the direction-X-component of the width of each lenticular lens to the width in the direction X of each sub-pixel is configured to be a non-integer in this embodiment.

Figure 5A:
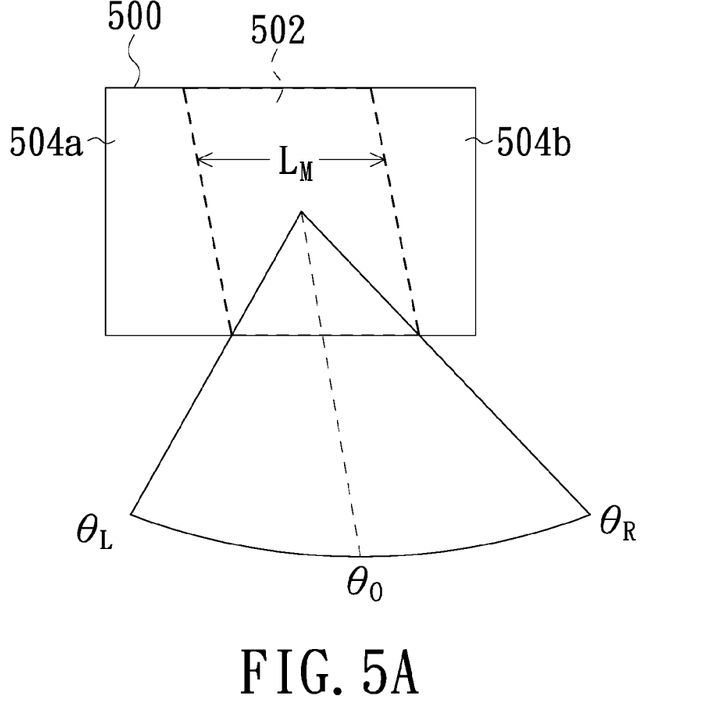
FIG. 5A is a schematic view illustrating a definition of the main-lobe and the side-lobe of an image displayed by an auto-stereoscopic display apparatus in accordance with an embodiment of the present disclosure.

FIG. 5A is a schematic view illustrating a definition of the main-lobe and the side-lobe of an image displayed by the auto-stereoscopic display apparatus 300 in accordance with an embodiment of the present disclosure. The knowledge about the main-lobe and side-lobe has been disclosed in many papers and documents (such as U.S. Pat. No. 7,736, 005) and is apparent to those ordinarily skilled in the art; and no redundant detail is to be given herein. In this embodiment as illustrated in FIG. 5A, the main-lobe 502 and the side-lobes 504a and 504b are defined on a display area 500 of the auto-stereoscopic display apparatus 300 (that is, the image displayed by the display panel 312 through the lens layer 316) when a user stands at a specific viewing distance from the auto-stereoscopic display apparatus 300.

Figure 5B:
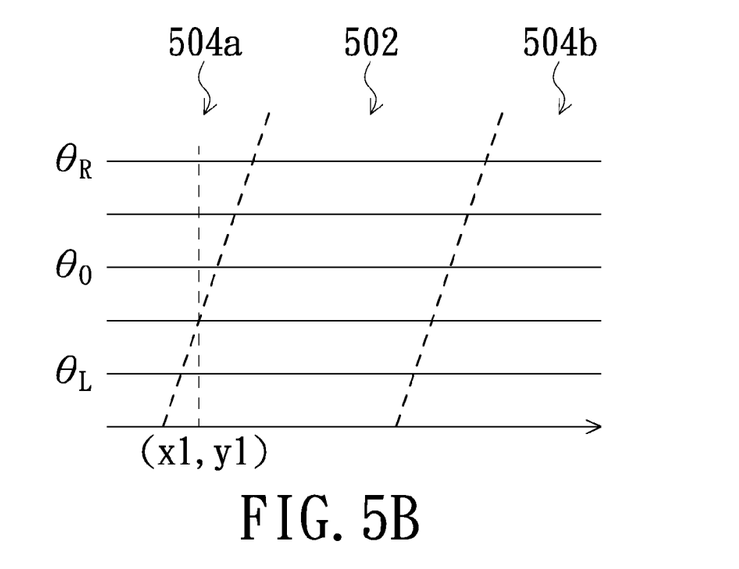
FIG. 5B is a schematic view illustrating a variation of the main-lobe and side-lobes when a user has different viewing angles relative to a display area.

FIG. 5B is a schematic view illustrating a variation of the main-lobe 502 and side-lobes 504a, 504b when a user has different viewing angles relative to the display area 500. Please refer to FIGS. 5A and 5B together. As shown, the positions of the main-lobe 502 and the side-lobes 504a, 504b in the display area 500 vary with the position of a user. For example, the coordinate (x1, y1) in the display area 500 is located in the side-lobe 504a when a user's viewing angle and the display area 500 have an angle $\theta_0$ therebetween; and the coordinate (x1, y1) is located in the main-lobe 502 when a user's viewing angle and the display area 500 have an angle $\theta_L$ therebetween. In summary, the area of the main-lobe 502 in the display area 500 decreases with the decreasing distance from the user to the auto-stereoscopic display apparatus 300. Therefore, the auto-stereoscopic display apparatus 300 may have a frequent switch between the main-lobe 502 and the side-lobes 504a, 504b if a user have a movement relative to the display panel within the observable angular range; and consequentially, some specified poor image display performance (such as the saw-tooth) may occur in the junction area of the main-lobe 502 and the side-lobes 504a, 504b. Thus, it is important to select a proper panel width $L_M$ of the main-lobe 502.

Therefore, a design method, for auto-stereoscopic display apparatus with specific hardware specification (for example, with or without eye-tracking system) in response to a specific required panel width $L_M$ of the main-lobe 502, is provided.

Figure 6A:
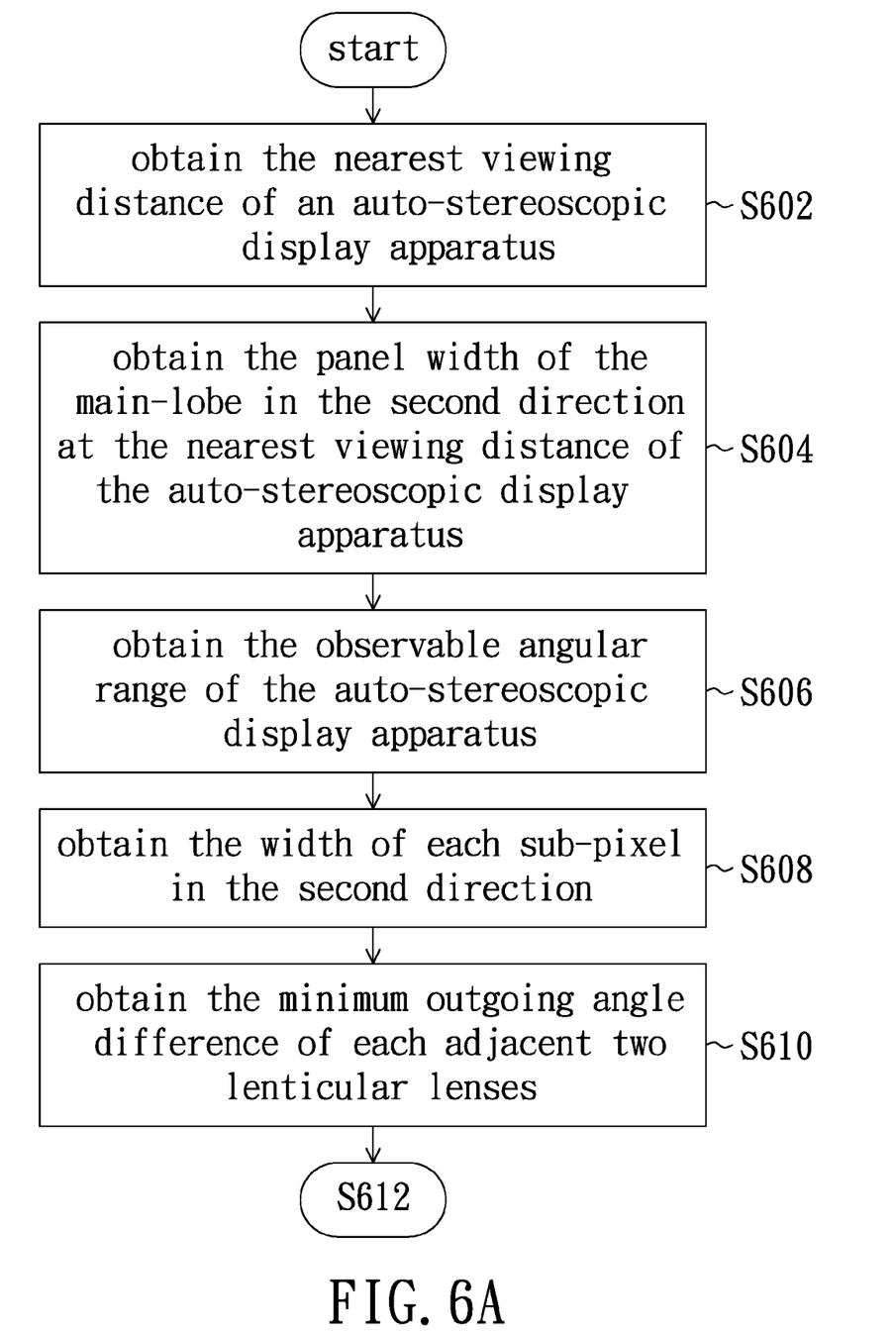
FIGS. 6A~6C are flowcharts illustrating a design method for auto-stereoscopic display apparatus in accordance with an embodiment of the present disclosure.
Figure 6B:
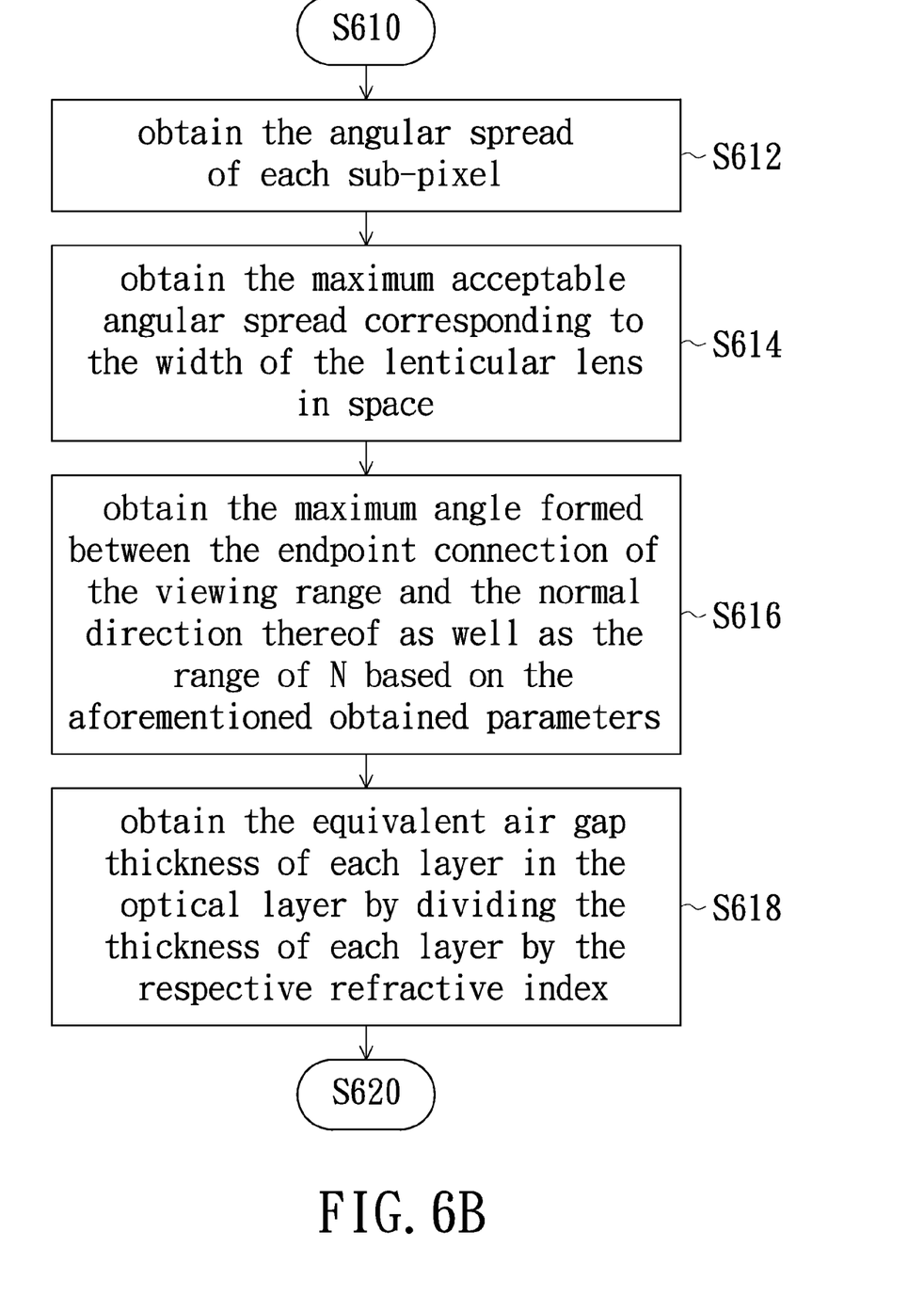
Figure 6C:
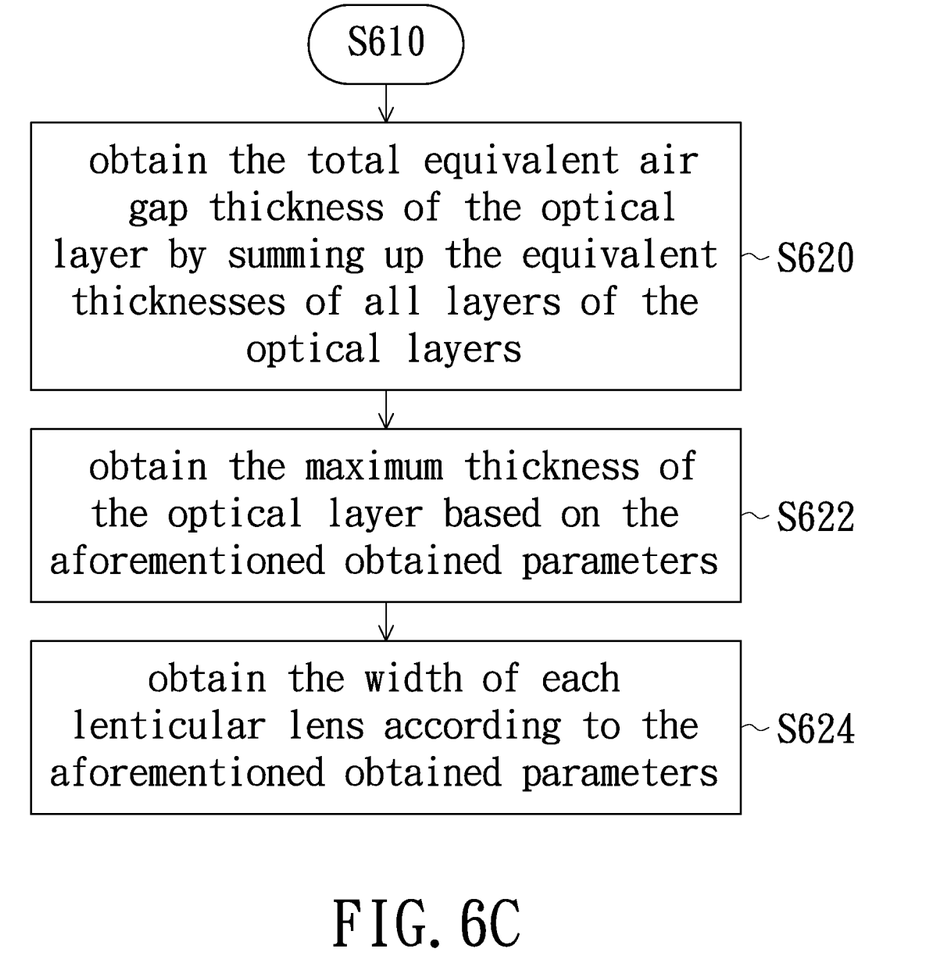

FIGS. 6A~6C are flowcharts illustrating a design method for auto-stereoscopic display apparatus in accordance with an embodiment of the present disclosure; wherein the process of the design method may have an application software form capable of being stored in a storage medium. In addition, it is to be noted the order of the steps of the design method disclosed in this embodiment is for the purpose of illustration only and the present disclosure is not limited thereto.

Please refer to FIGS. 5A and 6A~6C together. First, the nearest viewing distance of an auto-stereoscopic display apparatus is obtained (step S602); wherein the aforementioned nearest viewing distance is defined as NVD. Next, the panel width of the main-lobe 502 in a second direction (i.e., the direction X) at the nearest viewing distance NVD of the auto-stereoscopic display apparatus is obtained (step S604); wherein the aforementioned panel width is defined as $L_M$. Because the exemplary auto-stereoscopic display apparatus in this embodiment is not implemented with an eye-tracking system, the panel width $L_M$ of the main-lobe 502 is configured to be equal to or greater than the panel width of the display panel in the second direction (that is, the panel width of the display area 500 in FIG. 5A), so as to avoid the occurrence of frequent switch between the main-lobe 502 and side-lobes 504a, 504b when a user has a movement in the viewing range. Specifically, the panel width $L_M$ of the main-lobe 502 is configured to be equal to the panel width L of the display panel in this embodiment. Next, the observable angular range of the auto-stereoscopic display apparatus is obtained (step S606); wherein the aforementioned observable angular range is defined as $\phi$ as illustrated in FIG. 7B (step S606). Next, the width of each sub-pixel in the second direction is obtained (step S608); wherein the aforementioned width is defined as $w_p$. Next, the minimum outgoing angle difference of each adjacent two lenticular lenses is obtained (step S610); wherein the aforementioned minimum outgoing angle difference is defined as $\Delta\theta$. Next, the angular spread of each sub-pixel is obtained (step S612); wherein the aforementioned angular spread is defined as $\gamma$, as illustrated in FIG. 7A.

Figure 7A:
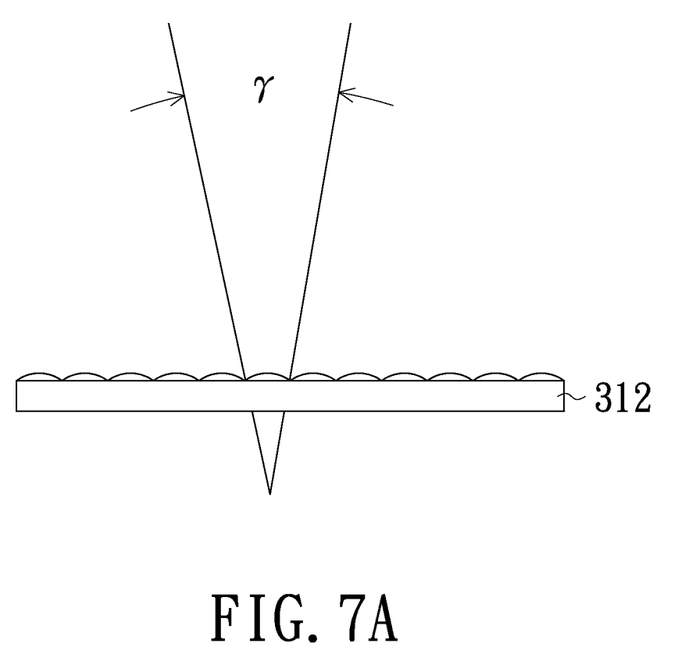
FIGS. 7A~7C are schematic views illustrating the definitions of some parameters associated with the auto-stereoscopic display apparatus of the present disclosure.
Figure 7B:
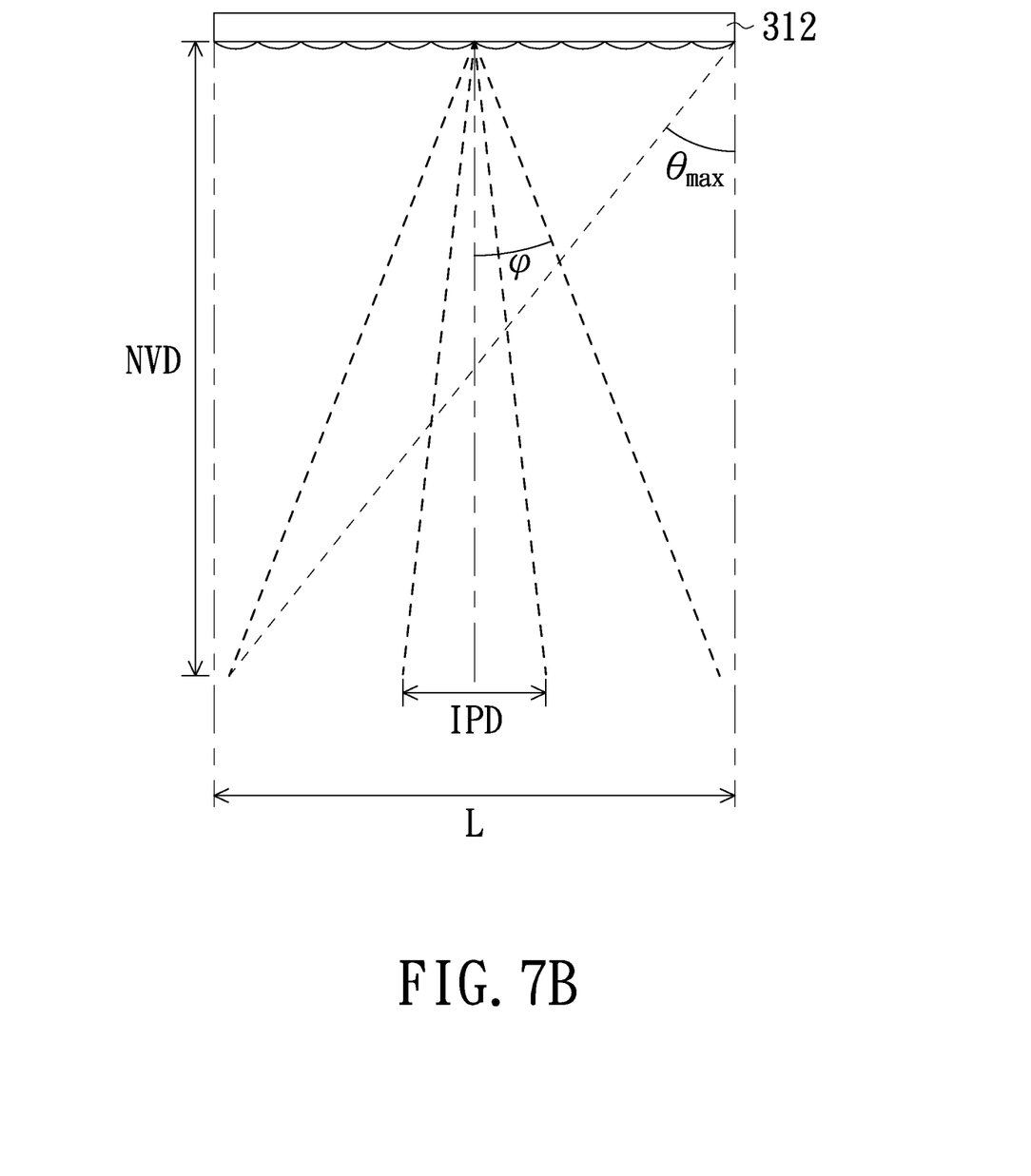
Figure 7C:
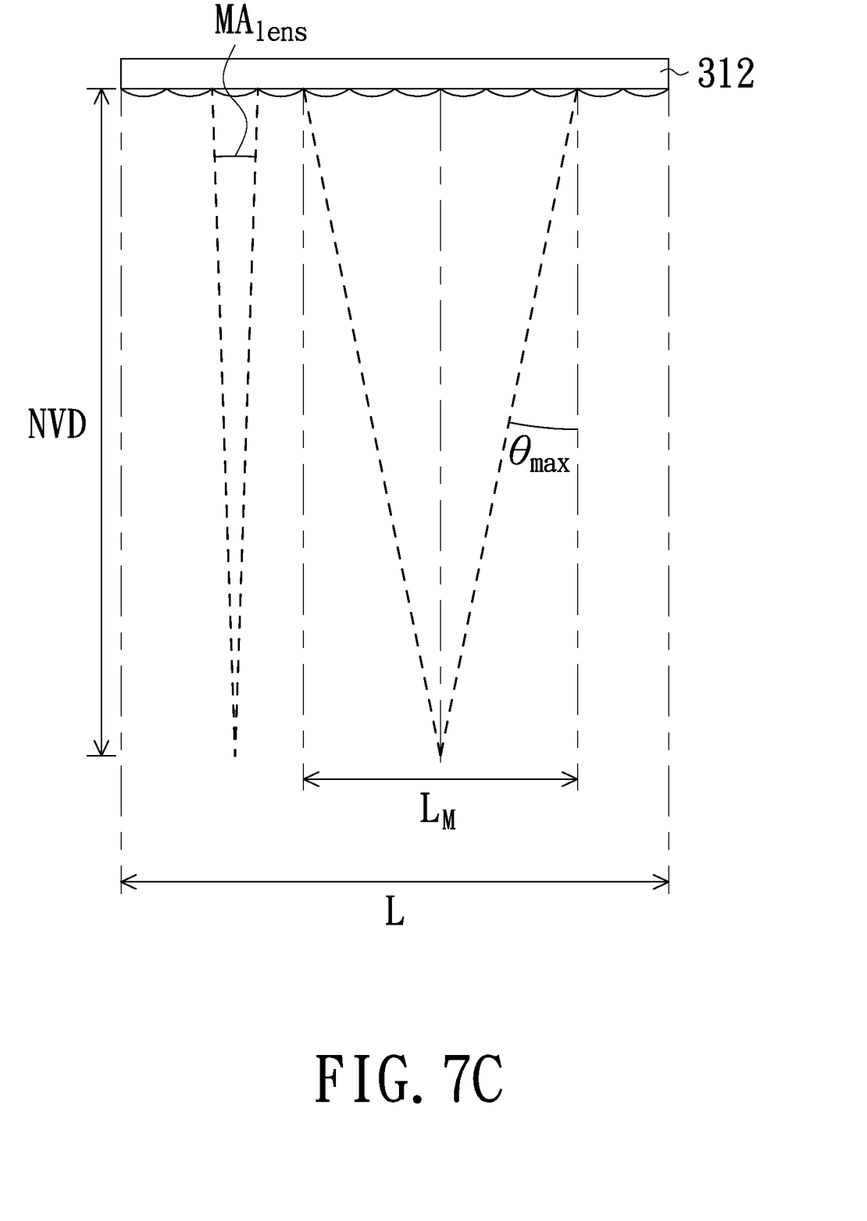

Please continue to refer to FIGS. 6 and 7. Next, the maximum acceptable angular spread corresponding to the width of the lenticular lens in space is obtained (step S614); wherein the aforementioned maximum acceptable angular spread is defined as $MA_{lense}$, as illustrated in FIG. 7C. Next, the maximum angle formed between the endpoint connection of the viewing range and the normal direction thereof as well as the range of the aforementioned N are obtained based on the aforementioned $\gamma$, $\phi$, $w_p\Delta\theta$, $MA_{lense}$, NVD and L (step S616); wherein the aforementioned maximum angle is defined as $\theta_{max}$. The $\theta_{max}$ may be obtained by the following equation:

$$\theta_{max}=\tan^{-1}(\tan\phi+L/2NVD)$$

Furthermore, the range of N can be expressed as $N_{min} \le N \le N_{max}$. In one embodiment, $N_{min}$ may be obtained by the following equation
In one embodiment, $N_{min}$ may be obtained by the following equation:

$$N_{min} = \frac{1}{\tan\gamma}\left(2\tan\varphi + \frac{L}{NVD}\right) - 0.5$$

Furthermore, $N_{max}$ may be obtained by the following equation:

$$N_{max} = \frac{0.5w_p\tan\Delta\theta + 2\tan(MA_{lense}/2)(2NVD\tan\varphi + L)}{w_p(2\tan\varphi + L/NVD - \tan\Delta\theta)}$$

In one embodiment, the panel width L of the display panel in the second direction and the nearest viewing distance NDV may have a ratio relationship $L/NVD \le 0.73-2\tan\phi$. In addition, the aforementioned minimum outgoing angle difference $\Delta\theta$ of each adjacent two lenticular lenses is configured to be smaller than $1.75\times10^{-2}$, and preferable is smaller than $8.73\times10^{-3}$.

In this embodiment, the optical layer 314 shown in FIG. 3 includes a polarizing layer, an optical switch layer and a dummy layer; wherein the total equivalent air gap thickness of the optical layers 314 is defined as $d_{air}$. Next, the equivalent air gap thickness of each layer in the optical layer 314 is obtained by dividing the thickness of each layer in the optical layer 314 by the respective refractive index (step S618). Next, the total equivalent air gap thickness of the optical layer 314 is obtained by summing up the equivalent thicknesses of all layers of the optical layers 314 (step S620). Next, the maximum thickness $d_{max}$ of the optical layer 314 is obtained based on the N, φ, $w_p$, L and NVD (step S622); wherein N herein must locate in the range obtained in step S616.

In this embodiment, $d_{max}$ and $d_{air}$ may have a relationship $d_{max} - \Delta d \leq d_{air} \leq d_{max} + \Delta d$, wherein $\Delta d/d_{max} < 0.1$. In addition, $d_{max}$ may be obtained by the following equation:

$$d_{max} = (N+0.5) w_p NVD / (2NVD \tan \phi + L)$$

Then, the component $P_x$ of width P in the second direction of each lenticular lens in the lens layer 316 is obtained according to the required Δθ, N, $w_p$ and $d_{max}$ (step S624). In one embodiment, Px may be obtained by the following equation:

$$P_x \cong N w_p - d_{max} \tan \Delta\theta$$

In addition, the width P of lenticular lens and the nearest viewing distance NVD may have a ratio relationship $P/NVD \leq 2.09 \times 10^{-3}$; and preferably the ratio relationship is $P/NVD \leq 1.57 \times 10^{-3}$. In this embodiment, the panel width $L_M$ of main-lobe and the nearest viewing distance NVD may have a ratio relationship $L/NVD \leq 0.73 - 2 \tan \phi$. In addition, the aforementioned parameters P, N, θ, and $w_p$ have a relationship $0.9750 \leq P/Nw_p \cos \theta_s \leq 0.9975$.

In some embodiments, the auto-stereoscopic display apparatus 300 may further define a specific viewing distance (SVD), which has a value larger than the nearest viewing distance (NVD). Specifically, a user may have better three-dimensional visual effects (such as the motion parallax) if he or she stands between the specific viewing distance (SVD) and the nearest viewing distance (NVD) from the auto-stereoscopic display apparatus 300. Therefore, an area between the specific viewing distance (SVD) and the nearest viewing distance (NVD) is defined to as an optimum viewing area. It is to be noted that a user may still successfully observe a three-dimensional image if he or she has a position farther from the nearest viewing distance; however, the observed image depth decreases with the increasing of the position of the user from the nearest viewing distance (NVD).

In the aforementioned embodiments, the maximum angular spread γ of each sub-pixel can be determined based on the specific viewing distance (SVD), that is $\gamma \leq \tan^{-1}$ (IPD/SVD); wherein IPD herein stands for the interpupillary distance, as illustrated in FIG. 7B.

Figure 8:
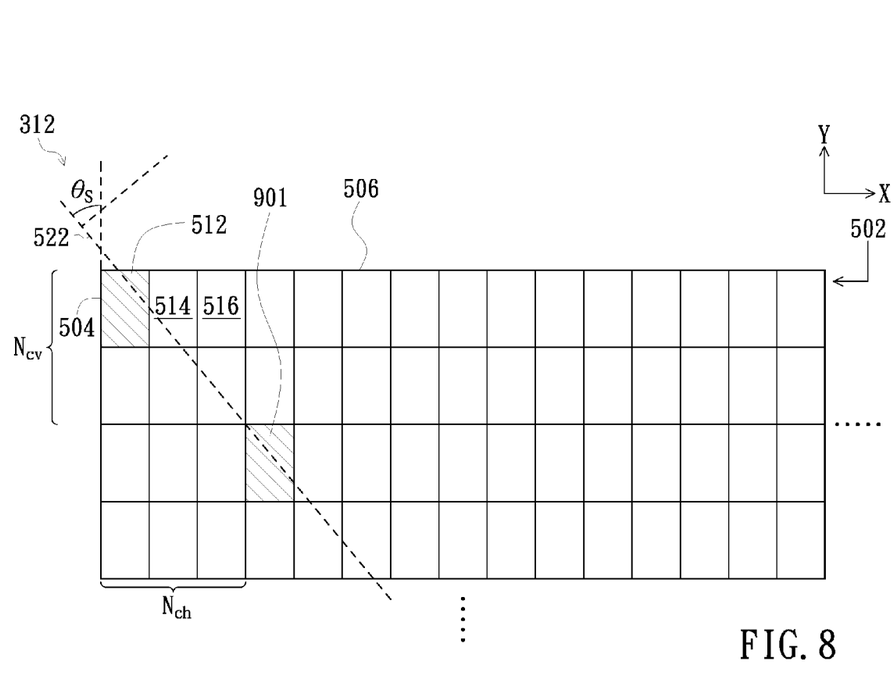
FIG. 8 is a schematic view of a titled lenticular lens.

In addition, because of the Moiré-like pattern may occur between the lens layer 316 and the pixel array (not shown) on the display panel 312, in one embodiment the lenticular lenses of the lens layer 316 may be relatively titled for the reduction or even elimination of the brightness degree of the resulted fringes, as illustrated in FIG. 8. Through being titled, the lenticular lens is configured to have the extension direction thereof having an angle $\theta_s$ relative to the direction Y. For the purpose of reducing or eliminating the Moiré-like pattern as well as to meet of the requirements of the aforementioned Δθ, the optimum $\theta_s$ may be obtained by the following equation:

$$\theta_s = \tan^{-1}\left(\frac{d_{air} \tan \Delta\theta + N_{ch} w_p / 3}{N_{cv} w_p}\right)$$

In the above equation, $N_{ev}$ and $N_{ch}$ stand for the counts of sub-pixel in the directions Y and X between the two resource sub-pixels which result in the aforementioned angle difference Δθ, respectively. For example, as illustrated in FIG. 8, because the sub-pixels 512 and 901 are the two sub-pixels resulting in the angle difference Δθ, the $N_{cv}$ is 2 and the $N_{ch}$ is 3. Furthermore, the aforementioned $N_{CV}$ and the nearest viewing distance NVD may have a ratio relationship $N_{cv} w_p / NVD \leq 1.57 \times 10^{-3}$; and preferably the ratio relationship is equal to or smaller than $8.73 \times 10^{-4}$.

Figure 9:
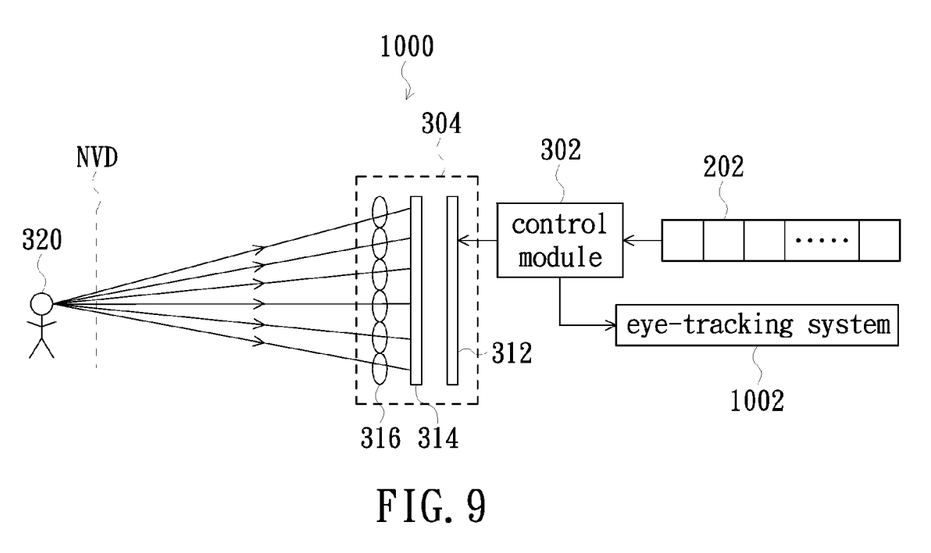
FIG. 9 is a schematic view of an auto-stereoscopic display apparatus in accordance with another embodiment of the present disclosure.

FIG. 9 is a schematic view illustrating an auto-stereoscopic display apparatus displaying a three-dimensional image in accordance with another embodiment of the present disclosure. Compared with the auto-stereoscopic display apparatus 300 shown in FIG. 3, the auto-stereoscopic display apparatus 1000 in this embodiment is further implemented with an eye-tracking system 1002. The design process and the function of the auto-stereoscopic display apparatus 1000 in this embodiment are similar to that of the auto-stereoscopic display apparatus 300, please refer to FIGS. 6A and 6B for more detailed information and no redundant detail is to be given herein.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A non-transitory computer readable storage device for storing an application software adapted to be used for designing an auto-stereoscopic display apparatus, the auto-stereoscopic display apparatus comprising a display area, the display area comprising a display panel and a lens layer, the display panel being configured to receive an image sequence and accordingly display a corresponding image, the display panel comprising a plurality of pixel rows sequentially arranged in a first direction, each one of the pixel rows comprising a plurality of pixels sequentially arranged in a second direction substantially perpendicular to the first direction, and each one of the pixels comprising a plurality of sub-pixels sequentially arranged in the second direction, the lens layer being disposed on the display panel and comprising a plurality of lenticular lenses substantially arranged in the second direction, N successive sub-pixels in each pixel row being corporately covered by one of the lenticular lenses, a ratio of a component of a width in the second direction of each lenticular lens to a width of each sub-pixel in the second direction being configured to a non-integer, an execution of the application software comprising steps of:

obtaining a nearest viewing distance of the auto-stereoscopic display apparatus and defining the aforementioned nearest viewing distance as NVD;

obtaining a panel width of the display panel in the second direction and defining the aforementioned panel width as L;

obtaining an observable angular range of the auto-stereoscopic display apparatus and defining the aforementioned observable angular range as φ;

obtaining a width of each one of the sub-pixels in the second direction and defining the aforementioned width as wp;

obtaining a minimum outgoing angle difference of each adjacent two lenticular lenses and defining the aforementioned minimum outgoing angle difference as;

obtaining an angular spread of each one of the sub-pixels and defining the aforementioned angular spread as γ;

obtaining a maximum acceptable angular spread corresponding to the width of the lenticular lens in a space and defining the aforementioned maximum acceptable angular spread as MAlense; and calculating a value $N_{min}$ and a value $N_{max}$ according to the $\gamma$, $\phi$, $w_p$, $\Delta\theta$, $MA_{lense}$, NVD and L, wherein $N_{min} \leq N \leq N_{max}$;

wherein the software application calculates the value $N_{min}$ based on an equation $$N_{min} = \frac{1}{\tan\gamma}\left(2\tan\varphi + \frac{L}{NVD}\right) - 0.5.$$

2. The non-transitory computer readable storage device according to claim 1, wherein the software application calculates the value $N_{max}$ based on an equation $$N_{max} = \frac{0.5w_p\tan\Delta\theta + 2\tan(MA_{lense}/2)(2NVD\tan\varphi + L)}{w_p(2\tan\varphi + L/NVD - \tan\Delta\theta)}.$$

3. A non-transitory computer readable storage device for storing an application software adapted to be used for designing an auto-stereoscopic display apparatus, the auto-stereoscopic display apparatus comprising a display area and an eye-tracking system, the display area comprising a display panel and a lens layer, the display panel being configured to receive an image sequence and accordingly display a corresponding image, the display panel comprising a plurality of pixel rows sequentially arranged in a first direction, each one of the pixel rows comprising a plurality of pixels sequentially arranged in a second direction substantially perpendicular to the first direction, and each one of the pixels comprising a plurality of sub-pixels sequentially arranged in the second direction, the lens layer being disposed on the display panel and comprising a plurality of lenticular lenses substantially arranged in the second direction, N successive sub-pixels in each pixel row being corporately covered by one of the lenticular lenses, a ratio of a component of a width in the second direction of each lenticular lens to a width of each sub-pixel in the second direction being configured to a non-integer, the eye-tracking system being configured to track a position of user's eyes, an execution of the application software comprising steps of:

obtaining a nearest viewing distance of the auto-stereoscopic display apparatus and defining the aforementioned nearest viewing distance as NVD;

obtaining a panel width of a main-lobe observed at the nearest viewing distance and defining the aforementioned panel width as LM;

obtaining a width of each one of the sub-pixels in the second direction and defining the aforementioned width as wp;

obtaining a minimum outgoing angle difference of each adjacent two lenticular lenses and defining the aforementioned minimum outgoing angle difference as;

obtaining an angular spread of each one of the sub-pixels and defining the aforementioned angular spread as $\gamma$;

obtaining a maximum acceptable angular spread corresponding to the width of the lenticular lens in a space and defining the aforementioned maximum acceptable angular spread as MAlense; and calculating a value $N_{min}$ and a value $N_{max}$ according to the $\gamma$, $\phi$, $w_p$, $\Delta\theta$, $MA_{lense}$, NVD and L, wherein $N_{min} \leq n \leq N_{max}$;

wherein the software application calculates the value $N_{min}$ based on an equation $$N_{min} = \frac{1}{\tan\gamma}\left(\frac{L_M}{NVD}\right) - 0.5.$$

4. The non-transitory computer readable storage device according to claim 3, wherein the software application calculates the $N_{max}$ value based on an equation $$N_{max} = \frac{0.5w_p\tan\Delta\theta + 2\tan(MA_{lense}/2)L_M}{w_p(L_M/NVD - \tan\Delta\theta)}.$$

5. The non-transitory computer readable storage device according to claim 3, wherein the execution of the application software further comprises steps of:

obtaining a total equivalent air gap thickness of the optical layer by summing up all the thicknesses of each layer in the optical layer divided by a respective and defining the aforementioned total equivalent air gap thickness of the optical layer as $d_{air}$; and calculating a value $d_{max}$ according to the N, $\phi$, $w_p$, $\Delta\theta$, NVD and L, wherein $d_{max} - \Delta d \leq d_{air} \leq d_{max} + \Delta d$ and $\Delta d/d_{max} < 0.1$.

6. The non-transitory computer readable storage device according to claim 5, wherein the software application calculates the value $d_{max}$ based on an equation $d_{max} = (N+0.5)w_p NVD/L_M$.

* * * * *